United States Patent [19]

Takahashi et al.

[11] 3,847,708

[45] Nov. 12, 1974

[54] APPARATUS FOR MAKING BAGS FROM SOFT TAPES OF SYNTHETIC RESINS

[75] Inventors: Shizuo Takahashi, Abiko; Yoshio Kobayashi, Nagareyama; Toshio Hosogai, Tokyo, all of Japan

[73] Assignee: Tokyo Automatic Machinery Works, Ltd., Tokyo, Japan

[22] Filed: Oct. 10, 1972

[21] Appl. No.: 296,014

[52] U.S. Cl.............. 156/510, 156/250, 226/88, 93/8 R, 93/26, 83/508, 53/183
[51] Int. Cl................. B31b 1/10, B65b 43/04
[58] Field of Search...... 156/510, 515, 250; 226/88; 83/508, 471.2, 408, 356.2, 353; 93/8 R, 21-29; 53/384, 390, 183

[56] References Cited
UNITED STATES PATENTS

| | | | |
|---|---|---|---|
| 3,607,573 | 9/1971 | Michaelides | 156/515 |
| 3,224,705 | 12/1965 | Nash | 226/88 |
| 2,847,806 | 8/1958 | Wang | 53/384 |
| 2,517,147 | 8/1950 | Vee | 226/88 |
| 2,660,218 | 11/1953 | Johnson et al. | 156/515 |
| 3,203,291 | 8/1965 | Elsas | 83/408 |
| 2,746,545 | 5/1956 | Chamberlain | 83/508 |
| 3,596,428 | 8/1971 | Young et al. | 53/183 |

*Primary Examiner*—Charles E. Van Horn
*Assistant Examiner*—M. G. Wityshyn
*Attorney, Agent, or Firm*—Sherman & Shalloway

[57] ABSTRACT

An apparatus for making bags of a soft two-ply film tape by delivering the tape upwards in the perpendicular direction and sealing and cutting the tape while it is maintained in the erect state, said apparatus comprising a reinforcing device provided above a pair of feed rolls for said tape, a pressing device provided above said reinforcing device, a sealing device provided immediately below said pressing device and a cutting device provided immediately below said sealing device.

3 Claims, 5 Drawing Figures

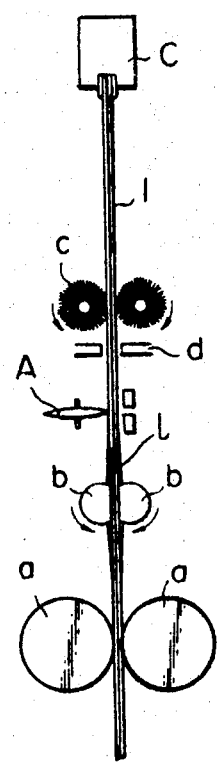
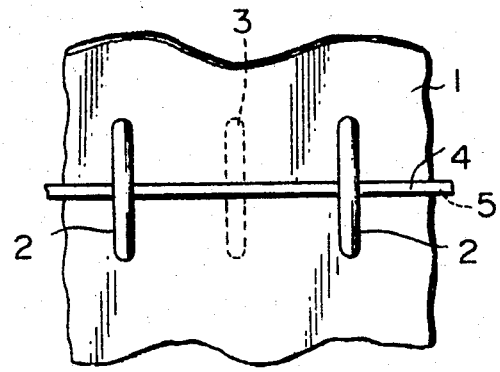
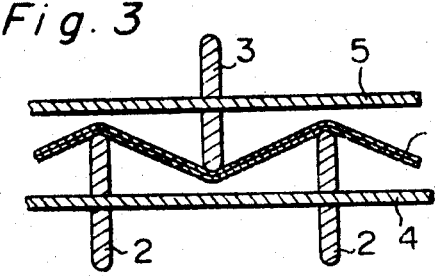
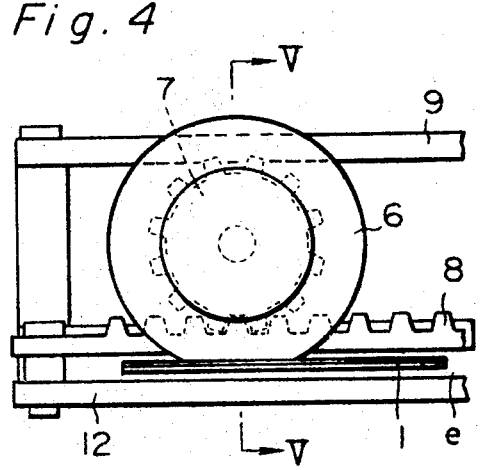
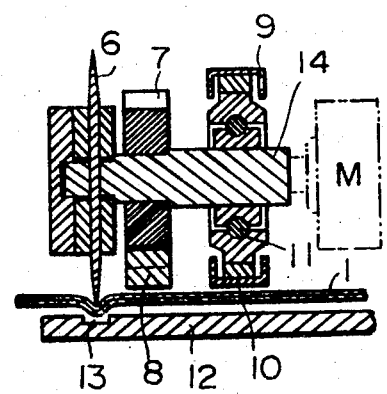

APPARATUS FOR MAKING BAGS FROM SOFT TAPES OF SYNTHETIC RESINS

This invention relates to an apparatus for continuously making packaging bags using a soft tape of a synthetic resin.

A method has already been well known for producing bags by cutting a long strip of a two-ply laminated tape to a predetermined length, sealing one end of the cut tape, and continuously delivering the resulting bag. A variety of apparatuses are also known for producing such bags. The two-ply laminated tape as referred to above is produced by flattening a tubular film, and usually, tapes of this kind are available as a long strip and handled as being wound up in a drum shape. In the prior art method, the tape is released from the drum and carried on a belt conveyor or the like arranged horizontally or obliquely. During transfer, the tape is made into bags by a cutter and a sealing device, and continuously delivered.

The present invention relates to an apparatus for making bags, wherein a tape released from the drum is delivered upwardly in the vertical direction, and then sealed and cut. Since the tape used in this invention is produced from a relatively soft and pliable film of a synthetic resin, it must be reinforced or supported in order to maintain it erect in the perpendicular direction. Special contrivance is also necessary for the cutting of the tape. The present invention has solved these problems.

It is an object of this invention to provide an apparatus for making bags by delivering a tape of a soft film continuously upwardly in the vertical direction, and sealing and cutting the tape to make bags while maintaining the tape erect in the vertical direction.

Another object of this invention is to provide an apparatus for making bags in great quantities rapidly and assuredly while maintaining them upright in the perpendicular direction.

Roughly, the apparatus of this invention comprises the following constituents:

a. a device for providing frills in a film tape fed, and delivering it upright in the vertical direction;

b. a device for cutting the upright tape automatically;

c. a device located above the tape for imparting tension to the tape.

The invention will now be described in greater detail by reference to the accompanying drawings in which:

FIG. 1 is a side elevation of the apparatus of this invention;

FIG. 2 is an enlarged view of one embodiment of the device for delivering the tape in the reinforced state;

FIG. 3 is a transverse sectional view of the device shown in FIG. 2;

FIG. 4 is a bottom view of one embodiment of the cutting device; and

FIG. 5 is a side elevation taken on the line V—V of FIG. 4.

Referring to FIG. 1, the apparatus of this invention will be described in sequence of operation. A tape 1 of a soft two-ply film released from a drum (not shown) is delivered upwardly along the vertical axis $l$ by a pair of frill-imparting rollers $b$ via a pair of feed rollers $a$, while being supported by a pair of rotating brushes $c$ provided further upwards. A cutting device $A$ and a sealing device $d$ are provided between said pair of frill-imparting rollers $b$ and said pair of rotating brushes $c$.

The frill-imparting rolls $b$ will first be described. The tape used in the present invention is made of a relatively soft film of a synthetic resin such as polyethylene. When such a tape of poor toughness is delivered upwards in the vertical direction, it will soon be bent downwards. In order to remedy this defect, frills are provided on the tape to render it tough and capable of being erect. This makes it possible to deliver the tape in the vertical direction to a predetermined height and feed it to the tape processing device located above. The frill-imparting device is shown in FIGS. 2 and 3. Shafts 4 and 5 including a plurality of guide wheels 2 and 3 respectively at certain intervals are provided in a manner so as to interpose the tape 1 therebetween. The distance between the shafts 4 and 5 and the diameters of the guide wheel 2 and 3 are suitably selected. The shafts 4 and 5 are driven in the direction shown by the arrows in FIG. 1. Thus, as shown in FIG. 3, frills are provided on the tape 1, and this renders the tape 1 tough. By forming frills in the manner mentioned above, even soft tapes can be delivered upwardly in the vertical direction while being maintained erect. Other devices than that shown in FIGS. 2 and 3 may be employed to impart frills.

The tape 1, on which frills have been formed as described above, is then sealed by the sealing device $d$, and cut by the cutting device A. If tension exerted on the tape 1 is small, the tape is difficult to cut. In order to facilitate cutting of the tape, an increased tension is applied to the tape 1 by holding it with the brushes $c$ which are rotating in the direction shown by the arrow in FIG. 1. The brushes $c$ act in conformity to the frills formed on the tape 1. Other devices may be used to exert tension on the tape 1 instead of the rotating brushes.

The cutting device A is shown in FIG. 5. As is clear from the contour of the cutting device A shown in FIG. 2, the cutting device A includes a rotating blade on one side of the tape 1 and a stationary frame. The stationary frame includes a pair of spaced apart guide rails 9, a rack 8 and a cutting stand 12. A predetermined clearance $e$ exists between the cutting stand 12 and the rack 8, and the tape 1 is passed through the clearance. As shown in FIG. 5, the cutting blade portion comprises a rotating blade 6 and a pinion 7 secured to an extended portion of a shaft 14 of motor M. The pinion 7 meshes with the rack 8. The cutting blade portion is driven by the motor M, and therefore, by the energisation of motor M, the shaft 14 rotates along the rack 8 as a result of meshing of the rack 8 with the pinion 7. The cutting blade portion and the motor M moves in a direction parallel to the plane formed by the meshing head of the rack 8. The shaft 14 is therefore supported by bearing 11, and a member 10 secured to the bearing 11 is adapted to slide freely on the guide rail 9. In other words, the motor and the cutting blade portion are slidably supported by the guide rail 9. The cutting blade 6 is rotated by the motor M and its cutting edge is moved in a direction at right angles to the advancing direction of the tape 1. That is to say, the blade 6 moves across the tape 1. The cutting edge of the rotating blade 6 rotates along a groove 13 formed in the cutting stand 12 while being maintained close to the groove 13, and the blade 6 cuts the tape 1 while rotating. The position of the guide rail 9 may be other than that shown in FIGS. 4 and 5.

When one cutting cycle is over and the next cutting is to be performed, the motor M is rotated in the reverse direction, whereby the rotating blade 6 can be returned to the original position while continuing the cutting operation.

When the soft film tape 1 has been moved on a vertical path or axis $l$ over a predetermined distance and stopped in the taut state, the cutting blade moves across the transfer passageway along the guide rail 9 and the rack 8 according to the driving of the motor M, and cuts the film tape 1. Therefore, the rotating blade 6 is not limited in its cutting direction, and performs the cutting operation throughout its reciprocative movement. No time is therefore wasted in the cutting operation.

If desired, a bag-opening device C may be provided at the top as shown in FIG. 1. This device is an accessory, and may be of any desired construction.

The operation of the apparatus of the present invention for delivering and cutting the tape in accordance with the present invention will be described below.

1. The feed rolls $a$, the frill-imparting rolls $b$, and the rotating brushes $c$ are simultaneously rotated to bring the tape 1 upwards along the vertical line $l$.

2. When the upper end of the tape 1 reaches a predetermined position, for example the bag-opening device C, the feed rolls $a$, the frill-imparting rolls $b$, and the rotating brushes $c$ are stopped, and then the tape is sealed. During the heat-pressing sealing operation, the tape 1 is cut by the cutting device A.

3. The cut tape, which is now in the form of a bag, is removed after the sealing and cutting operations by tying or transfer. Then, the feed rolls $a$, the frill-imparting rolls $b$, and the rotating brushes $c$ are rotated to bring the tape 1 upwards to the predetermined position, for example the bag-opening device C, and then the tape is sealed and cut. In this case, the rotating blade 6 moves in the opposite direction.

The operations (1), (2) and (3) are repeated.

The greatest feature of the present invention is that the tape 1 can be delivered upwards at high speed by the provision of the feed rolls $a$, the frill-imparting rolls $b$ and the rotating brushes $c$, and that by the provision of frills in the soft tape 1, it is possible to maintain the tape 1 erect.

A second advantage is that the soft film tape 1 can be cut rapidly and assuredly by exerting a suitable tension thereto through the brushes $c$ which will conform to the frills provided on the film tape and maintain the tape conveniently in the taut state.

A third advantage of the present invention is that a precise cutting of the tape 1 can be done. Since the rotating blade 6 is moved at a constant speed by the meshing of the rack 8 with the pinion 7 and simultaneously the rotating blade 6 is rotated, the soft film tape 1 can be very easily and precisely cut. In the above-described cutting state, the cutting edge of the blade 6 comes into contact only with the soft film, and therefore, the cutting blade 6 can be used for long periods of time without undergoing any damage.

What we claim is:

1. An apparatus for making bags of a soft two-ply tape by delivering the tape upwardly in the vertical direction and sealing and cutting the tape while it is maintained in the erect state, said apparatus comprising
   a pair of feed rollers for delivering the tape upwardly in the vertical direction,
   a frill-imparting means disposed above said feed rollers to increase the toughness of the tape by imparting frills to the tape delivered by said feed rollers in its longitudinal direction,
   a cutting device for cutting the tape disposed above said frill-imparting means,
   a sealing device for sealing the tape disposed above said cutting device, and
   a pair of rotating brushes disposed above said sealing device for nipping the tape frilled by said frill-imparting means to apply tension thereto.

2. The apparatus of claim 1 wherein said frill-imparting means is composed of two rotatable, horizontally opposed shafts arranged such that the tape is adapted to pass therebetween and each having a plurality of wheels fixed at predetermined intervals, the wheels being positioned such that a wheel fixed to one shaft adapted to engage one side of the tape is interposed between two wheels fixed to the other shaft adapted to engage the opposite side of the tape, whereby frills are imparted to the tape in its longitudinal direction.

3. The apparatus of claim 1 wherein said cutting device comprises
   a stationary frame including a pair of spaced-apart guide rails disposed on one side of the tape, a rack disposed on the same side of the tape and extending substantially at right angles to the vertical and parallel to said tape, and a cutting stand disposed with respect to said guide rails and rack on the opposite side of the tape;
   a motor whose extended portion has a rotatable shaft slideably supported by said guide rails in a direction substantially vertical;
   a pinion fixed to said extended portion to be in mesh with said rack;
   a rotatable blade fixed to said extended portion;
   a groove being formed in said cutting stand to extend in a direction at right angles to the vertical and parallel to said tape to correspond to the position of said rotatable blade;
   whereby said rotatable blade is rotated and displaced along said groove when said shaft is rotated by said motor so that the tape is cut by the cutting edge of said rotatable blade.

* * * * *

UNITED STATES PATENT OFFICE
CERTIFICATE OF CORRECTION

Patent No. 3,847,708      Dated November 12, 1974

Inventor(s) SHIZUO TAKAHASHI ET AL

It is certified that error appears in the above-identified patent and that said Letters Patent are hereby corrected as shown below:

In the Heading, insert patentees' Foreign Application Priority Data as follows:

-- Claims priority, application Japan, Oct. 12, 1971, 46/94,333; application Japan, Oct. 12, 1971, 46/94,334. --

Signed and sealed this 14th day of January 1975.

(SEAL)
Attest:

McCOY M. GIBSON JR.
Attesting Officer

C. MARSHALL DANN
Commissioner of Patents